United States Patent [19]

Nishiguichi et al.

[11] Patent Number: 5,409,975
[45] Date of Patent: Apr. 25, 1995

[54] AROMATIC POLYCARBONATE COPOLYMER, A PROCESS FOR PRODUCING THE SAME, AND A PLASTIC OPTICAL WAVEGUIDE USING THE SAME

[75] Inventors: Masaki Nishiguichi, Chiba; Toshimasa Tokuda, Iyo, both of Japan

[73] Assignees: The Furukawa Electric Co., Ltd.; Teijin Chemicals, Ltd., both of Tokyo, Japan

[21] Appl. No.: 140,544

[22] Filed: Oct. 25, 1993

[30] Foreign Application Priority Data

| Nov. 2, 1992 | [JP] | Japan | 4-294421 |
| Nov. 2, 1992 | [JP] | Japan | 4-294422 |
| Nov. 2, 1992 | [JP] | Japan | 4-315595 |
| Nov. 2, 1992 | [JP] | Japan | 4-315597 |
| Nov. 2, 1992 | [JP] | Japan | 4-315599 |
| Nov. 2, 1992 | [JP] | Japan | 4-315601 |

[51] Int. Cl.$^6$ .......................... G08G 64/10
[52] U.S. Cl. .................. 524/147; 524/302; 524/323; 528/202; 528/204
[58] Field of Search ............... 528/202, 204; 524/147, 524/302, 323

[56] References Cited

U.S. PATENT DOCUMENTS

3,546,165  12/1970  Morgan.
4,346,211   8/1982  Krishnan ..................... 528/202

FOREIGN PATENT DOCUMENTS

| 282062  | 9/1988  | European Pat. Off. . |
| 8317    | 1/1985  | Japan . |
| 292105  | 12/1986 | Japan . |
| 19307   | 1/1989  | Japan . |
| 031825  | 2/1989  | Japan .................. 528/202 |
| 178519  | 7/1989  | Japan . |
| 12283   | 2/1991  | Japan . |

OTHER PUBLICATIONS

Database WPI, Week 9115, Derwent Publications Ltd., London, GB; AN 91-105060 (abstract).
Morgan, Macromolecules, pp. 536-544 (1970).

*Primary Examiner*—David Buttner

[57] ABSTRACT

There is provided an aromatic polycarbonate copolymer obtained by reacting a dihydric phenol component comprising mainly 2,2-bis(4-hydroxyphenyl)-1,1,1,3,3,3-hexafluoropropane and 9,9-bis(4-hydroxyphenyl)fluorene or 1,1-bis(4-hydroxyphenyl)-1-phenylethane in a prescribed ratio with a carbonate precursor substance. This aromatic polycarbonate copolymer has a specific viscosity in a limited range. The aromatic polycarbonate copolymer is excellent in optical characteristics, transparency, hydrolysis resistance, heat resistance, oxidation resistance, and heat stability and good in moldability, and is suitable for a plastic optical waveguide that is small in transmission loss and excellent in heat resistance.

9 Claims, 3 Drawing Sheets

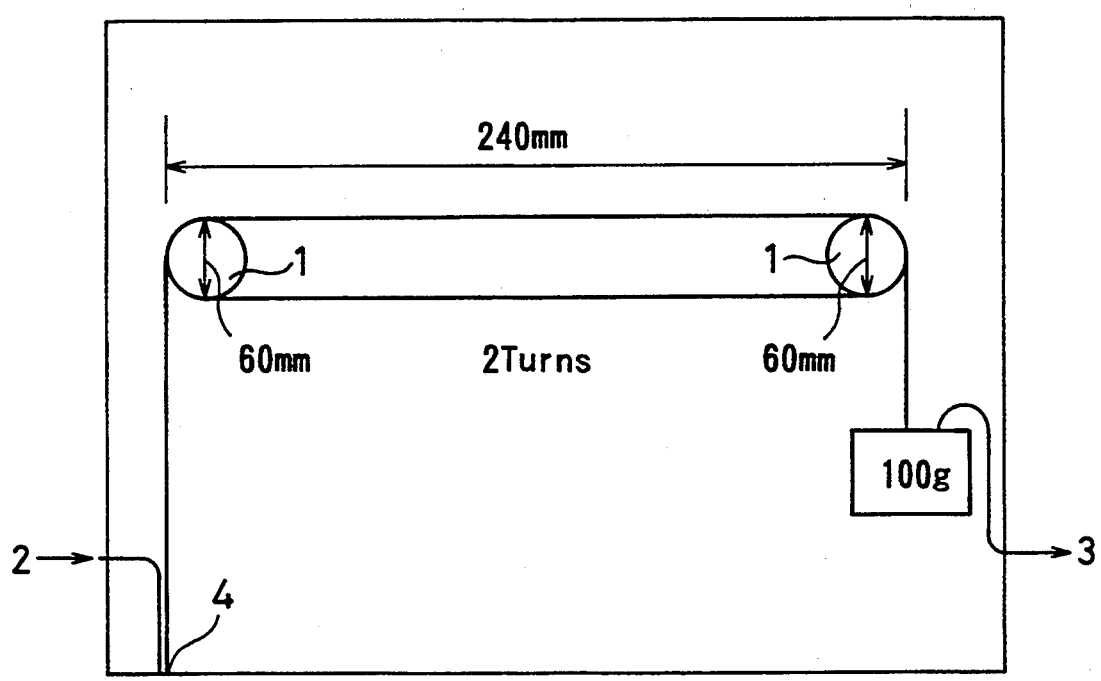
F I G. 1

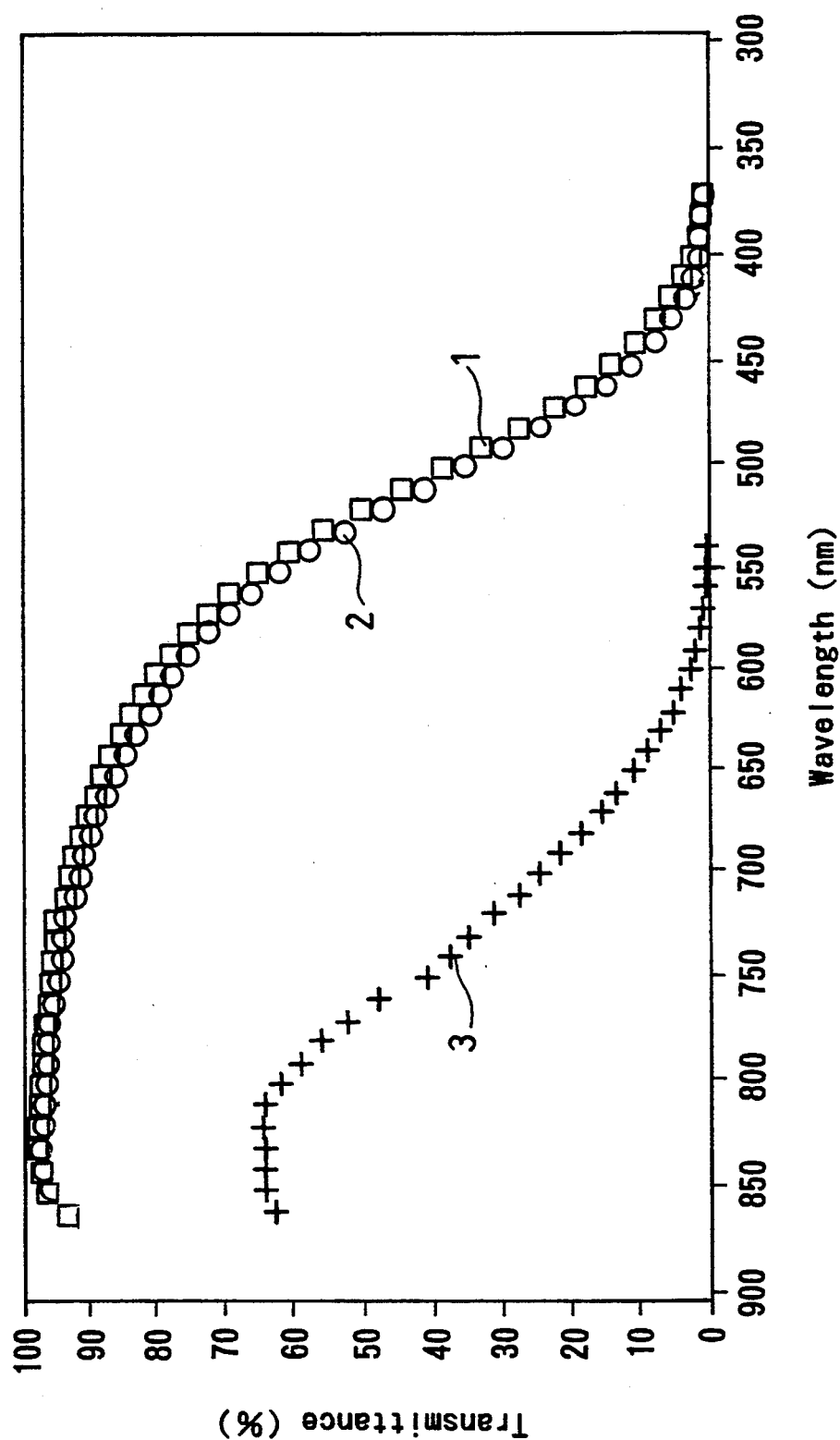

AROMATIC POLYCARBONATE COPOLYMER, A PROCESS FOR PRODUCING THE SAME, AND A PLASTIC OPTICAL WAVEGUIDE USING THE SAME

FIELD OF THE INVENTION

The present invention relates to an aromatic polycarbonate copolymer, a process for producing the same, and a plastic optical waveguide (e.g., plastic optical fiber) that uses the same. More particularly the present invention relates to an aromatic polycarbonate copolymer particularly excellent in hydrolysis resistance, heat resistance, heat stability, and oxidation resistance, and good in transparency and molding properties; a process for producing the same; and a plastic optical waveguide using the same.

BACKGROUND OF THE INVENTION

Polycarbonates obtained from 2,2-bis(4-hydroxyphenyl)propane (hereinafter abbreviated bisphenol A) and a carbonate precursor substance, such as diphenyl carbonate or phosgene, are conventionally known as typical aromatic polycarbonates. Since they have a variety of excellent properties; that is, they are transparent and they are excellent in heat resistance and mechanical properties, and good in dimensional accuracy, they are widely used as engineering plastics. However, in recent years, amid the trend that light weight, thinness, and compactness (downsizing) of machinery, tools, and the like are considered important, there are increased cases in which engineering plastics are used at locations closer to a heat source in optical usage. Consequently, it is required that engineering plastics be good in optical properties, such as light transmittance, and in addition higher in hydrolysis resistance, heat resistance, heat stability, and oxidation resistance.

On the other hand, it is known that aromatic polycarbonates excellent in heat resistance can be obtained by reacting 2,2-bis(4-hydroxyphenyl)-1,1,1,3,3,3-hexafluoropropane (hereinafter abbreviated to bisphenol AF) with a carbonate precursor substance (Japanese Patent Publication No. 12283/1991). However, aromatic polycarbonates obtained from usual bisphenol AF are poorer in hydrolysis resistance and heat stability than polycarbonates from bisphenol A; in addition the glass transition temperature thereof is less than 160° C., and the heat resistance thereof is not sufficiently satisfactory. It is also known that an aromatic polycarbonate excellent in heat resistance is obtained by reacting 9,9-bis(4-hydroxyphenyl)fluorene (hereinafter referred to as bisphenol FL) with a carbonate precursor substance (U.S. Pat. No. 3,546,165). However, there are such problems as that when this aromatic polycarbonate is synthesized, a large amount of an insoluble gel is formed in the solvent and the yield of the solvent-soluble component is at most 60 to 70%, which hinder practicability; and that even when melt-molding of this aromatic polycarbonate is attempted, the melt viscosity is too high for it to be molded. Further, an alternating copolymer of bisphenol AF and bisphenol FL is also known (*Macromolecules*, Vol. 3, No. 5, 1970, 536 to 544). However, this copolymer is not such a random copolymer as described in the present invention, but an alternating copolymer in which the molar ratio of bisphenol AF and bisphenol FL is 50:50. The softening point of the alternating copolymer is too high compared with the random copolymer having specific molar ratio of the present invention, resulting it being difficult to be melt molded. Further, this alternating copolymer is poor in oxidation resistance and lacks in practicability.

It is also known that, when 1,1-bis(4-hydroxyphenyl)-1-phenylethane (hereinafter abbreviated to bisphenol AP) is reacted with a carbonate precursor substance, an aromatic polycarbonate high in glass transition temperature is obtained (Japanese Patent Application (OPI) No. 8317/1985). However, the polycarbonate from bisphenol AP is inferior to the polycarbonate from bisphenol A in heat stability.

As described above, since polycarbonates obtained from bisphenol A, which are conventionally known as typical aromatic polycarbonates, and which are obtained by reacting bisphenol A with phosgene are, transparent, recently their transparency has been taken advantage of and they have been developed for application in the field of information disks, optical fibers, lenses, etc.

Usually plastic optical fibers are high in light transmission loss and thus generally cannot be used for long-distance transmission, but since they are flexible and are easy in terminal workability, they should be useful for signal transmission lines of automobiles and electronic equipment. Since the core part of most conventional plastic optical fibers is made of a polymethyl methacrylate, it has a heat resistance no higher than 100° C., and therefore the conventional plastic optical fibers cannot be used in engine compartments of automobiles or contained in heat-resistant parts of electronic equipment.

To improve this, in a case wherein heat resistance is needed, plastic optical fibers having a core part that uses a polycarbonate A (having repeating units with the below-given structural formula (A)) are used, but even the heat resistance of optical plastic fiber using this polycarbonate is only 125° to 130° C.

It is known that by using a polycarbonate AF (having repeating units with the below-given structural formula (B)) for a core part, a plastic optical fiber that can be used at a temperature of about 145° C. can be obtained (Japanese Patent Application (OPI) Nos. 292105/1986 and 19307/1989).

However, polycarbonates AF are susceptible to hydrolysis and are poor in reliability under high temperatures, and when they are heated under a high humidity for a long period of time, the transmission loss increases. When a plastic optical fiber having a core part made of a polycarbonate AF is exposed to high temperatures, the elongation at breakage of the fiber lowers considerably. The glass transition temperature of polycarbonates AF is on the order of 160° C., and the upper limit of the temperature at which the plastic optical fiber having a core part made of a polycarbonate AF can be used is about 145° C.

Although improving the heat resistance of plastic optical fibers has been studied by using, as a core material, modified polycarbonates having higher glass transition temperatures, the moldability, the oxidation resistance, and the chemical stability are insufficient, and satisfactory results have not necessarily been obtained. For example, polycarbonates AP (having the below-given structural formula (C) and a glass transition temperature of 179° C.), polycarbonates PP (having the below-given structural formula (D) and a glass transition temperature of 196° C.), and polycarbonates Z (having the below-given structural formula (E) and a glass transition temperature of 170° C.), are high in glass transition temperature, but they are poor in oxidation resistance and chemical stability, and their coloring advances in a short period of time under high temperatures, thereby causing an increase in transmission loss.

A plastic optical fiber was intended to be manufactured by using polycarbonates having the below-given structural formula (F), but molding was impossible because the molecule was rigid.

Further, a plastic optical fiber was intended to be manufactured by using polycarbonates having the below-given structural formula (G) and a glass transition temperature of 278° C., but the molding of the polycarbonates into a plastic optical fiber was difficult because the melt-molding temperature was too high.

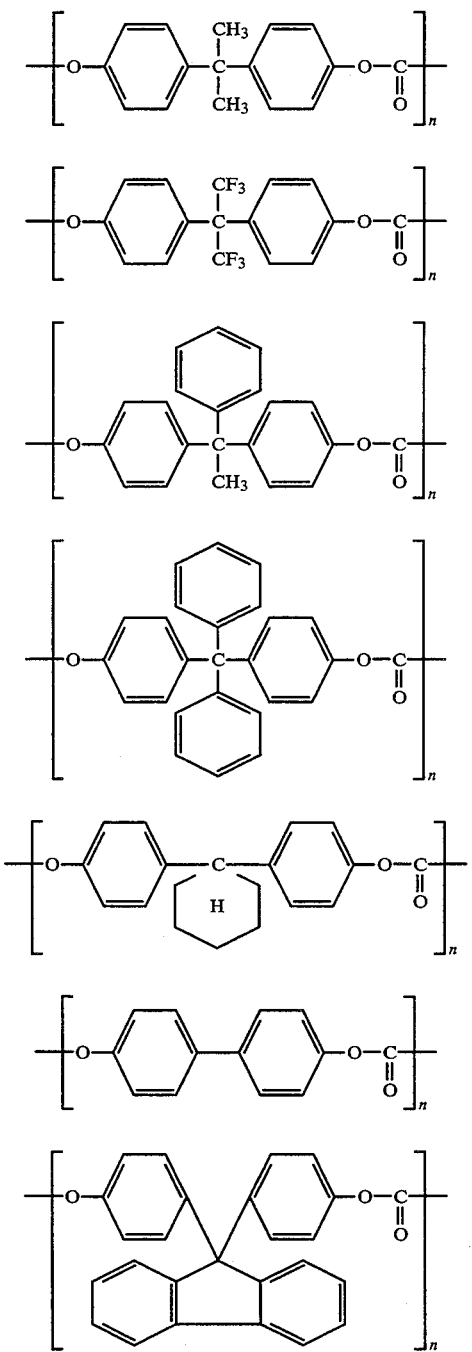

SUMMARY OF THE INVENTION

According to the present invention, there is provided an aromatic polycarbonate copolymer that has a specific viscosity within a specified range and that is excellent, for example, in optical properties, transparency, hydrolysis resistance, oxidation resistance, heat resistance, and heat stability; which copolymer can be obtained by reacting a dihydric phenol component, containing bisphenol AF and at least one selected from bisphenol FL and bisphenol AP in a prescribed ratio, with a carbonate precursor substance.

An object of the present invention is to provide an aromatic polycarbonate copolymer that is excellent in optical properties, such as light transmittance, and excellent in such properties as hydrolysis resistance, heat resistance, oxidation resistance, heat stability, and moldability.

Another object of the present invention is to provide a production process that can produce an aromatic polycarbonate copolymer having versatile properties, including optical properties, thermal properties, water resistance, and moldability, without producing a large amount of an insoluble gel.

A still further object of the present invention is to provide an optical waveguide, such as a plastic optical fiber that use the above aromatic polycarbonate copolymer which optical waveguide is high in heat resistance and its increase in transmission loss is low even when used at high temperatures.

Other features and advantages of the present invention will be apparent from the following description, taken in connection with the accompanying drawings.

BRIEF DESCRIPTION OF THE DRAWINGS

FIG. 1 is an explanatory view of a tensile test for measuring the transmission loss of a plastic optical fiber when a force is applied to the plastic optical fiber.

FIGS. 2 and 3 are charts of spectral light transmittance of solutions of heat-treated aromatic polycarbonate, to indicate the oxidation resistance of the aromatic polycarbonate.

DETAILED DESCRIPTION OF THE INVENTION

Figure 2:
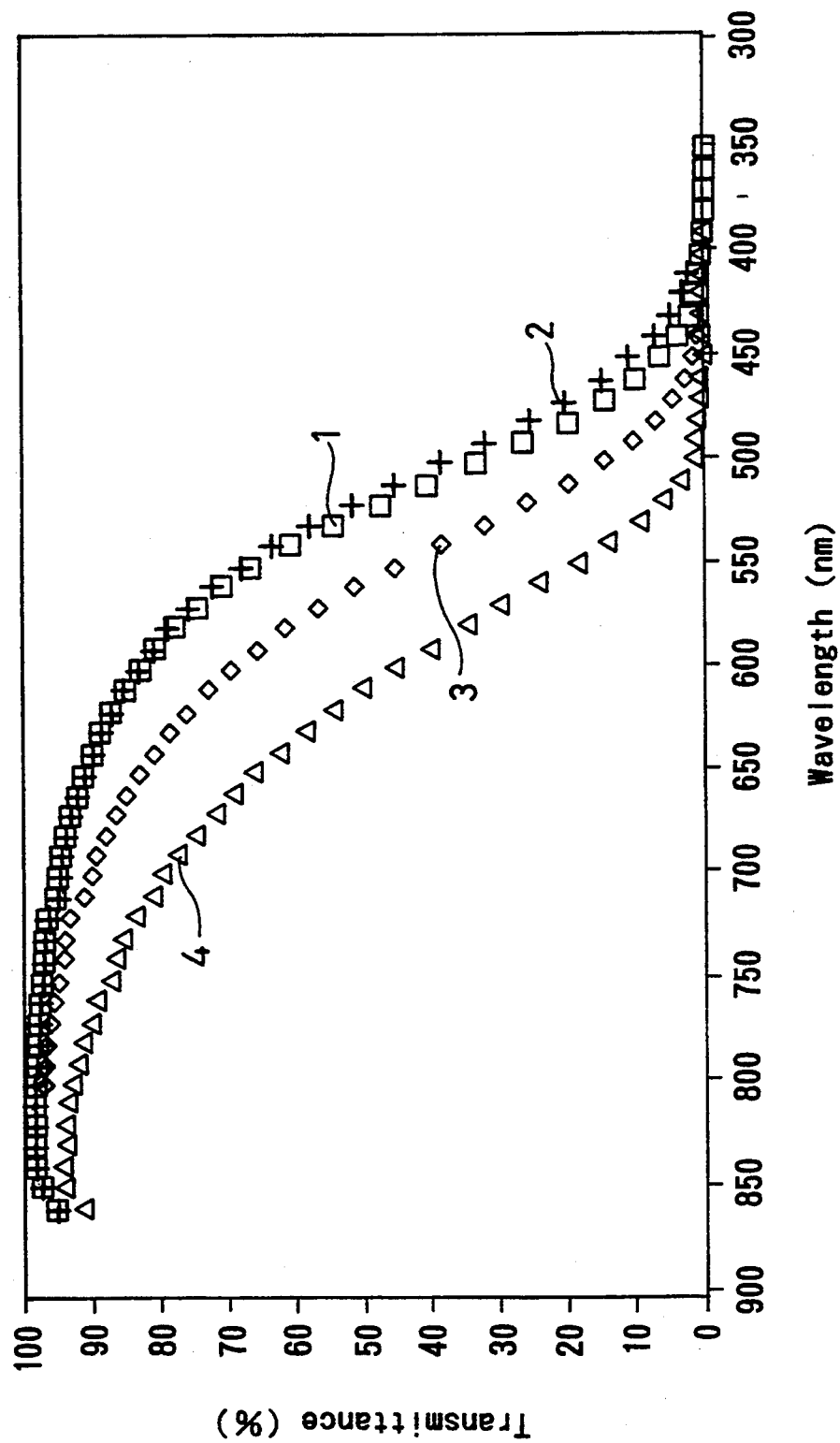

According to the present invention there is provided:

An aromatic polycarbonate copolymer, characterized in that said aromatic polycarbonate copolymer is obtained by reacting a dihydric phenol component, comprising mainly dihydric phenols of 53 to 99.5 mol % of 2,2-bis(4-hydroxyphenyl)-1,1,1,3,3,3-hexafluoropropane and 47 to 0.5 mol % of 9,9-bis(4-hydroxyphenyl)-fluorene, with a carbonate precursor substance; wherein when 0.7 g of said aromatic polycarbonate copolymer is dissolved in 100 ml of methylene chloride, the specific viscosity of the thus obtained solution measured at 20° C. is 0.160 to 0.418 (hereinafter referred to as the copolymer of the first embodiment), and an aromatic polycarbonate copolymer, characterized in that said aromatic polycarbonate copolymer is obtained by reacting a dihydric phenol, comprising mainly dihydric phenols of 15 to 99.5 mol % of 2,2-bis(4-hydroxyphenyl)-1,1,1,3,3,3-hexafluoropropane and 85 to 0.5 mol % of 1,1-bis(4-hydroxyphenyl)-1-phenylethane, with a carbonate precursor substance; wherein when 0.7 g of said aromatic polycarbonate copolymer is dissolved in 100 ml of methylene chloride, the specific viscosity of the thus obtained solution measured at 20°

C. is 0.160 to 0.410 (hereinafter referred to as the copolymer of the second embodiment).

The bisphenol AF for use in the production of the copolymers of the first and second embodiments can be obtained by reacting hexafluoroacetone with phenol. If the amount of impurities in the bisphenol AF is too large, the transparency and the heat stability of the obtainable copolymer drop. Therefore, the bisphenol AF is preferably one that has been recrystallized, particularly preferably one that has been recrystallized repeatedly, so that the amount of impurities may be decreased to 0.02% or below, measured by liquid chromatography, to bring the purity to 99.98% or more. The bisphenol FL is obtained by reacting florenone with phenol. If the amount of impurities in the bisphenol FL is too large, the heat stability of the obtainable copolymer also drops. Therefore, the bisphenol FL is preferably one that has been recrystallized, particularly preferably one that has been recrystallized repeatedly, so that the amount of impurities may be decreased to 1% or below, measured by liquid chromatography, to bring the purity to 99% or more.

In the polymer of first embodiment, the proportion of the bisphenol AF to the bisphenol FL, i.e., the copolymerization proportion, is such that the proportion of the former is from 53 to 99.5 mol %, and the proportion of the latter is from 47 to 0.5 mol %; preferably the proportion of the former is from 53 to 95 mol %, and the proportion of the latter is from 47 to 5 mol %, and more preferably the proportion of the former is from 60 to 95 mol %, and the proportion of the latter is from 40 to 5 mol %. If the proportion of the bisphenol FL is less than 0.5 mol %, the desired hydrolysis resistance cannot be obtained; whereas if the proportion exceeds 47 mol %, the molding properties and the oxidation resistance are deteriorated. Further, when the proportion of the bisphenol FL is increased to 5 mol % or more, the hydrolysis resistance is further improved, and at the same time a high heat resistance can be secured.

The bisphenol AP for use in the copolymer of the second embodiment is obtained by reacting acetophenone with phenol. If the amount of impurities in the bisphenol AP is too large, the transparency and the heat stability of the obtainable copolymer also drop. Therefore the bisphenol AP is preferably one that has been recrystallized, particularly preferably one that has been recrystallized repeatedly so that the amount of impurities may be decreased to 0.05% or below, measured by liquid chromatography, to bring the purity to 99.95% or more. The proportion of the bisphenol AF to the bisphenol AP, i.e. the copolymerization proportion, is such that the proportion of the former is from 15 to 99.5 mol %, and the proportion of the latter is from 85 to 0.5 mol %; preferably the proportion of the former is from 15 to 95 mol %, and the proportion of the latter is 85 to 5 mol %; and more preferably the proportion of the former is 30 to 95 mol %, and the proportion of the latter is 70 to 5 mol %. If the proportion of the bisphenol AP is less than 0.5 mol %, the desired hydrolysis resistance cannot be obtained; whereas if the proportion exceeds 85 mol %, satisfactory heat stability is hardly secured. Further, if the proportion of the bisphenol AP is increased to 5 mol % or more, the hydrolysis resistance is further improved, and at the same time an excellent heat resistance can be obtained.

With respect to the aromatic polycarbonate copolymer, the process for producing the same, and the plastic optical waveguide using the same, according to the present invention, the description concerning the case wherein bisphenol AF and bisphenol FL are used as the dihydric phenol component also applies to the case wherein, instead of bisphenol FL, bisphenol FL and bisphenol AP are used in combination. Therefore the later case is also involved in the present invention. In this case, the total content of the bisphenol FL and bisphenol AP in the dihydric phenol component is the same value as that of bisphenol FL of the former case, which is 47 to 0.5 mol %. Further, the technical significance of the said content of bisphenol FL and bisphenol AP and their required physical properties, such as the specific viscosity, of the copolymer obtained, are the same as the case wherein bisphenol FL is used with bisphenol AF (e.g., the copolymer of the first embodiment), and therefore description is not repeated here, because the corresponding descriptions can be quoted.

In the copolymer of the present invention, other dihydric phenols can be further copolymerized if the amount thereof is small (generally 10 mol % or below). Examples of other dihydric phenol are bisphenol A, 4,4'-dihydroxybiphenyl, bis(4-hydroxyphenyl)methane, 1,1-bis(4-hydroxyphenyl)ethane, 1,1-bis(4-hydroxyphenyl)phenylethane, 2,2-bis(3-methyl-4-hydroxyphenyl)propane, 1,1-bis(4-hydroxyphenyl)cyclohexane, 2,2-bis(3-phenyl-4-hydroxyphenyl)propane, 2,2-bis(3-isopropyl-4-hydroxyphenyl)propane, 2,2-bis(4-hydroxyphenyl)butane, 2,2-bis(3,5-dimethyl-4-hydroxyphenyl)propane, 2,2-bis(3,5-dibromo-4-hydroxyphenyl)propane, 4,4'-dihydroxydiphenyl sulfone, 4,4'-dihydroxydiphenyl sulfoxide, 4,4'-dihydroxydiphenyl sulfide, 3,3'-dimethyl-4,4'-dihydroxydiphenyl sulfide, and 4,4'-dihydroxydiphenyl oxide.

As the carbonate precursor substance that is reacted with the above dihydric phenol, for example, phosgene and diphenyl carbonate can be mentioned. To produce the aromatic polycarbonates of the present invention, the usual methods used in producing a polycarbonate from bisphenol A, for example, the reaction of a dihydric phenol with phosgene and the ester exchange reaction of a dihydric phenol with a bisaryl carbonate preferably can be used. Preferably the molar ratio of the dihydric phenol to phosgene is generally such that 1 mol of the dihydric phenol is used to 1.05 to 1.50 mol of phosgene.

The reaction of the dihydric phenol with phosgene is generally carried out in the presence of an acid-bonding agent and an organic solvent. As the acid-bonding agent, for example, a hydroxide of an alkali metal, such as sodium hydroxide and potassium hydroxide, and pyridine can be used. As the organic solvent, for example, a halogenated hydrocarbon, such as methylene chloride and chlorobenzene, can be used. Further, in order to promote the reaction, a catalyst, such as a tertiary amine and a quaternary ammonium salt, can be used; and as a molecular weight modifier, a terminating agent is desirably used, such as phenol and p-tert-butylphenol. The reaction temperature is usually 0° to 40° C.; the reaction time is a few seconds to 5 hours; and preferably the pH during the reaction is generally kept at 10 or over.

On the other hand, in the transesterification, a dihydric phenol and a bisaryl carbonate are mixed in the atmosphere of an inert gas and are reacted generally at 120° to 350° C. under reduced pressure. The reduced pressure is changed stepwise and finally brought to 1 mmHg or below, to distill off formed phenols from the system. The reaction time is usually about 1 to 4 hours.

Further, if necessary, a molecular-weight-controlling agent and an antioxidant may be added.

If the molecular weight of the aromatic polycarbonate copolymer of the present invention is too small, molded articles become brittle; whereas if the molecular weight is too large, the flowability of the melt becomes poor and molded articles with good quality are hardly obtained. Therefore, the specific viscosity of aromatic polycarbonate copolymer, when 0.7 g of the copolymer is dissolved in 100 ml of methylene chloride and measurement is done at 20° C., is in the range from 0.160 to 0.418 (copolymer of the first embodiment) or from 0.160 to 0.410 (copolymer of the second embodiment), preferably in the range from 0.165 to 0.345, and more preferably in the range from 0.160 to 0.290.

The aromatic polycarbonate copolymers of the present invention will be molded into a film or other molded article. As the molding method, a method used for molding usual aromatic polycarbonates can be used; for example, the injection molding method, the compression molding method, the extrusion molding method, or the solution casting method may be arbitrarily used. In the molding, although the aromatic polycarbonate copolymers of the present invention may be molded as they are, if necessary, and depending on the usage, various additives, such as an antioxidant, a heat stabilizer, a light stabilizer, a lubricant, a releaser, a fire retardant, a dye, a pigment, an antistatic agent, a weathering agent, glass fiber, carbon fibber, and metal fiber, and inorganic materials, such as talc, may be added. These additives are mixed, for example, in the form of solutions, or are mixed in an arbitrary way; for example, by using a tumbler, a supermixer, or a Nauta mixer, and the mixture can be extruded into pellets or can be formed into a fiber, film, and the like. Further, the aromatic polycarbonate copolymers of the present invention may be used by mixing them with some other thermoplastic resins.

In particular, preferably the aromatic polycarbonate copolymers of the present invention are mixed with at least one antioxidant that is a phosphite type, a phenol type, or an organosulfur type. The phosphite type antioxidant used herein includes, triesters of phosphorous acid and diesters or monoesters of phosphorous acid which are formed by substituting the ester parts of esters of phosphorous acid, for example, by an alkyl group, a phenyl group, or an alkylaryl group, such as triphenyl phosphite, tris(nonylphenyl) phosphite, tris(2,4-di-tert-butylphenyl) phosphite, tridecyl phosphite, trioctyl phosphite, trioctadecyl phosphite, didecyl-monophenyl phosphite, dioctyl-monophenyl phosphite, diisopropyl-monophenyl phosphite, monobutyl-diphenyl phosphite, monodecyl-diphenyl phosphite, monooctyl-diphenyl phosphite, bis(2,6-di-tert-butyl-4-methylphenyl)pentaerythritol diphosphite, 2,2-methylenebis(4,6-di-tert-butylphenyl)octyl phosphite, bis(nonylphenyl)pentaerythritol diphosphite, bis(2,4-di-tert-butylphenyl)pentaerythritol diphosphite, tetrakis(2,4-di-tert-butylphenyl)-4,4-diphenylene phosphonite, which may be used alone or as a mixture of two or more, with particular preference given to tris(nonylphenyl) phosphite, tris(2,4-di-tert-butylphenyl) phosphite, and tetrakis(2,4-di-tert-butylphenyl)-4,4-diphenylene phosphonite.

The phenol type antioxidant is a hindered phenol compound that is a phenol compound having a bulky group(s) in the ortho position(s) relative to the hydroxyl group of the phenol compound, such as triethylene glycol bis[3-(3-tert-butyl-5-methyl-4-hydroxyphenyl) propionate], 1,6-hexanediol-bis[3-(3,5-di-tert-butyl-4-hydroxyphenyl) propionate], pentaerythritol-tetrakis[3-(3,5-di-tert-butyl-4-hydroxyphenyl) propionate], octadecyl-3-(3,5-di-tert-butyl-4-hydroxyphenyl) propionate, 1,3,5-trimethyl-2,4,6-tris(3,5-di-tert-butyl-4-hydroxybenzyl)benzene, N-N'-hexamethylenebis(3,5-di-tert-butyl-4-hydroxyhydrocinnamide), 3,5-di-tert-butyl-4-hydroxybenzyl phosphonate diethyl ester, tris(3,5-di-tert-butyl-4-hydroxybenzyl) isocyanurate, and 3,9-bis{1,1-dimethyl-2-[$\beta$-(3-tert-butyl-4-hydroxy-5-methylphenyl)propionyloxy]ethyl}-2,4,8,10-tetraoxaspiro(5,5)undecane, with particular preference given to pentaerythritol-tetrakis[3-(3,5-di-tert-butyl-4-hydroxyphenyl) propionate] and octadecyl-3-(3,5-di-tert-butyl-4-hydroxyphenyl) propionate.

As the organosulfur antioxidant, for example, tetrakis[methylene-3-(hexylthio) propionate]methane, tetrakis[methylene-3-(decylthio) propionate]methane, tetrakis[methylene-3-(laurylthio) propionate]methane, tetrakis[methylene-3-(octylthio) propionate]methane, dilauryl-3,3'-thiodipropionate, dimyristyl-3,3'-thiodipropionate, distearyl-3,3'-thiodipropionate, ditridecyl-3,3'-thiodipropionate, 2,2-thio-diethylenebis-[3-(3,5-di-tert-butyl-4-hydroxyphenyl) propionate], 2,2-thiobis(4-methyl-6-tert-butylphenol), and 2-mercaptobenzimidazole can be mentioned, with particular preference given to tetrakis[methylene-3-(laurylthio) propionate].

The amount of such an antioxidant to be used is 0.001 to 1.0 part by weight per 100 parts by weight of the aromatic polycarbonate copolymer.

Of the production process of the above aromatic polycarbonate copolymer particularly preferable is a method comprises reacting an aqueous alkali solution, containing dihydric phenols comprising mainly bisphenol A and bisphenol FL or bisphenol AP, with phosgene in the presence of an organic solvent, with the molar ratio of the phosgene to all of the bisphenols being from 1.15 to 1.30 and the reaction temperature being 20° C. or below.

As described above, in the method of the present invention, the reaction with phosgene is first carried out. The phosgenation is carried out in such a way either that bisphenol AF and bisphenol FL or bisphenol AF and bisphenol AP are dissolved in an aqueous alkali solution. An organic solvent is added thereto, and, after phosgene is reacted with the temperature kept at 20° C. or below, preferably 10° to 15° C., the polycondensation reaction is effected. Alternatively, an aqueous alkali solution containing bisphenol AF or bisphenol AP and an aqueous alkali solution containing bisphenol FL are separately prepared, an organic-solvent is added to each of the aqueous alkali solutions, then phosgene is reacted with each of the solutions with the temperature kept at 20° C. or below, preferably 10° to 15° C. The obtained oligomers are mixed and subjected to a polycondensation reaction. To cause phosgene to react with the bisphenol in the aqueous alkali solution, gaseous phosgene is blown into the aqueous alkali solutions, or liquid phosgene is mixed with the bisphenol in the aqueous alkali solutions. If the reaction temperature exceeds 20° C., decomposition of the terminal chloroformate increases and the heat stability of the resulting copolymer is deteriorated. The molar ratio of phosgene to be used is preferably in the range of from 1.15 to 1.30 per mol of total bisphenols. If the molar ratio of the phosgene is too small, the phosgene to be involved in the reaction becomes insufficient and a copolymer having a satisfactory degree of polymerization is hardly obtained; whereas if the molar ratio is too large, the terminal chloroformate remains in a large amount or that terminal chloroformate is hydrolyzed, to increase the amount of terminal OH groups, and therefore the heat stability and the oxidation resistance of the resulting copolymer become poor. During the reaction the pH is preferably kept at 10 or over, and at the time of phosgenation a small amount of a reducing agent, such as hydrosulfite, may be added.

The alkali used herein is preferably a strongly basic compound, such as a hydroxide of an alkali metal or an alkali earth metal, with particular preference given to sodium hydroxide and potassium hydroxide or the like. The water used in the aqueous alkali solutions is preferably one subjected to ion exchange treatment and preferably the aqueous alkali solutions are used after being deoxidized by passing nitrogen gas or the like. The concentration of the aqueous alkali solution is generally 1 to 10 wt %, preferably 3 to 7 wt %. The concentration of the bisphenols dissolved in the aqueous alkali solution is such that the total amount of the bisphenol AF and bisphenol FL is generally 1 to 20 wt %, preferably 3 to 10 wt %. The concentration of the bisphenols dissolved in the aqueous alkali solution is such that the total amount of the bisphenol AF and the bisphenol AP is generally 10 to 30 wt %, preferably 15 to 20 wt %. As the organic solvent, an organic solvent inert to the reaction, for example a halogenated hydrocarbon, such as methylene chloride and chlorobenzene, is preferable, and the organic solvent is also used preferably after being deoxidized, like the aqueous alkali solution.

In the present invention, an end-terminating agent can be used. As the end-terminating agent, for example, monohydric phenols, such as phenol and an alkylphenol, phenyl chlorocarbonate, or an acid halide, such as an aromatic or aliphatic carboxylic acid chloride, are used in a prescribed amount in a known manner.

The polycondensation reaction is effected generally at a temperature of 25° to 35° C., preferably 28° to 30° C. The reaction time is generally 10 min to 5 hours, preferably 30 min to 2 hours. During the reaction, the pH is preferably kept at 12 or over. Further, in order to facilitate the reaction, a small amount of an amine catalyst can be used. As preferable catalysts, quaternary ammonium compounds and tertiary amines, such as triethylamine, trimethylamine, triethylammonium bromide, and triethylammonium hydroxide, can be mentioned, and the amount of the catalyst to be used is generally 0.0001 to 0.01, preferably 0.002 to 0.005, in terms of molar ratio to the total amount of the bisphenols.

If the degree of polymerization of the thus obtained aromatic polycarbonate copolymer is too small, the articles molded therefrom become brittle; whereas if the degree of polymerization thereof is too large, the flowability of the melt becomes poor and molded articles with good quality are hardly obtained; so that the aromatic polycarbonate copolymer is preferably such that when 0.7 g of the polymer is dissolved in 100 ml of methylene chloride, the specific viscosity measured at 20° C. is in the range of 0.160 to 0.418 (in the case wherein the dihydric bisphenol comprises bisphenol FL) or 0.160 to 0.410 (in the case wherein the dihydric phenol comprises bisphenol AP) although an aromatic polycarbonate copolymer having the specific viscosity falling outside these ranges can of course be produced.

Since the aromatic polycarbonate copolymer of the present invention is particularly excellent in hydrolysis resistance, heat resistance, heat stability, and oxidation resistance, as well as being excellent in transparency and moldability, the aromatic polycarbonate copolymer of the present invention is quite useful in a field in which high heat resistance and optical properties are required; for example it is quite useful as a material for various optical devices, such as headlamp lenses, a variety of lenses, prisms, optical waveguides such as optical fiber, connectors, optical disks, and liquid crystal panels.

Preferably, the aromatic polycarbonate copolymer of the present invention is molded into a fiber to form an optical waveguide.

In this specification and the claims, "optical waveguide" means a light transmission device including an optical fiber, an optical lightguide, a plane optical waveguide, connecting part of optical waveguide, and an optical coupler.

According to the optical fiber embodiment, the present invention, is described below. However these description can usually be applied to other optical waveguide embodiments.

The above aromatic polycarbonate copolymers can be preferably used as a core material of a plastic optical fiber and they can give such a plastic optical fiber having a low transmission loss, such that when the plastic optical fiber is kept under a high temperature the increase in transmission loss is small and the extension of the fiber does not lower, and when a force is applied to the plastic optical fiber at that high temperature, the increase in transmission loss is small.

That is, there are provided:

1) a plastic optical waveguide, characterized in that said plastic optical waveguide has a core layer comprising an aromatic polycarbonate copolymer that is obtained by reacting a bisphenol component, containing 53 to 99.5 mol % of 2,2-bis(4-hydroxyphenyl)-1,1,1,3,3,3-hexafluoropropane and 47 to 0.5 mol % of 9,9-bis(4-hydroxyphenyl)fluorene with a carbonate precursor substance; wherein when 0.7 g of said aromatic polycarbonate copolymer is dissolved in 100 ml of methylene chloride, the specific viscosity measured at 20° C. is in the range of 0.160 to 0.418 (hereinafter referred to as the first optical waveguide); and 2) a plastic optical waveguide, characterized in that said plastic optical waveguide has a core layer comprising an aromatic polycarbonate copolymer that is obtained by reacting a bisphenol component, containing 15 to 99.5 mol % of 2,2-bis(4-hydroxyphenyl)-1,1,1,3,3,3-hexafluoropropane and 85 to 0.5 mol % of 1,1-bis(4-hydroxyphenyl)-1-phenylethane, with a carbonate precursor substance; wherein when 0.7 g of said aromatic polycarbonate copolymer is dissolved in 100 ml of methylene chloride, the specific viscosity measured at 20° C. is in the range of 0.160 to 0.410 (hereinafter referred to as the second optical waveguide).

The first optical waveguide is described below.

In the first optical fiber, the respective proportions of the bisphenol AF and the bisphenol FL used in the production of the aromatic polycarbonate are preferably from 53 to 95 mol % and from 47 to 5 mol %, more preferably from 60 to 95 mol % and from 40 to 5 mol %.

If the proportion of the bisphenol FL is less than 0.5 mol %, the polycarbonate of the core material is liable to be hydrolyzed under high temperatures and humidities, and therefore when the plastic optical fiber is exposed to a high temperature under a high humidity for a long period of time, the increase in transmission loss of the plastic optical fiber becomes large, and the physical strength of fiber lowers. Further, when the plastic optical fiber is exposed to even higher temperatures, the lowering in extension of the plastic optical fiber increases and the reliability of the plastic optical fiber becomes poor.

Further, when the proportion of the bisphenol FL is increased to 5% or more, not only can long-term resistance to heat up to about 145° C., and suppression of the lowering of the extension of the plastic optical fiber under a high temperature, be attained, but also mechanical strength at a temperature of about 150° C. can be secured, such that the plastic optical fiber will not shrink at about 150° C. and it will not extend when pulled a little under that temperature.

Further, if the proportion of the bisphenol AF is smaller than 53 mol %, the moldability becomes poor; therefore molding has to be carried out at a high temperature; and the plastic optical fiber is colored at the time of molding, which increases the transmission loss; and in addition, although a mechanical change, such as shrinkage or lowering in mechanical strength, under application under high temperatures would not occur, a conspicuous increase in transmission loss is recognized.

The polycarbonate copolymer to be used for the first optical fiber of the present invention is such that, when 0.7 g of the polycarbonate copolymer is dissolved in 100 ml of methylene chloride, the specific viscosity measured at 20° C. is 0.160 to 0.418. If the specific viscosity is smaller than 0.160, the strength of the plastic optical fiber drops noticeably; whereas if the specific viscosity is larger than 0.418, the molding becomes difficult and the value of the transmission loss of the obtainable plastic optical fiber becomes inevitably high. The specific viscosity is preferably in the range from 0.165 to 0.345, more preferably in the range from 0.165 to 0.290.

Since the polycarbonate copolymer of the core part of the plastic optical fiber is chemically stable and has a glass transition temperature as high as 155° C. or more, the increase in transmission loss is small if the present plastic optical fiber is exposed to a temperature of 145° C. for a long period of time. Further, if the present plastic optical fiber is exposed to that temperature for a long period of time, the drop of extension of the fiber is small.

Further, when the proportion of the bisphenol FL is increased to 5% or more, since the polycarbonate copolymer of the core part of the plastic optical fiber has a glass transition temperature of 160° C. or higher, the plastic optical fiber will not shrink or deform at a temperature of about 150° C. Also the increase in transmission loss is small if the plastic optical fiber is pulled by applying a force at that temperature. Further, the increase in transmission loss is very small if the plastic optical fiber is exposed to a temperature of 150° C.

Further, in comparison with polycarbonate AF, this polycarbonate copolymer is excellent in heat stability and it can be molded without its constituent polymer decomposing at the time of molding; that is, it can be molded with the transmission loss being low.

Further, this polycarbonate copolymer can be molded at a relatively low temperature of about 250° to 290° C., and the moldability is good. Further, since the polycarbonate copolymer can be molded at a temperature of 250° to 290° C., the polycarbonate is not decomposed at the time of the molding, and a plastic optical fiber having a low transmission loss can be obtained without lowering the transmission.

The second optical waveguide is described below.

In the second optical fiber, the respective proportions of the bisphenol AF and the bisphenol AP used in the production of the aromatic polycarbonate are from 15 to 99.5% and from 85 to 0.5 mol %, preferably from 15 to 95 mol % and from 85 to 5 mol %, and more preferably from 30 to 90 mol % and from 70 to 5 mol %.

If the proportion of the bisphenol AP becomes smaller than 0.5 mol %, the polycarbonate that is the core material is liable to be decomposed under high temperatures and humidities, and therefore when the plastic optical fiber is exposed to a high humidity and a high temperature for a long period of time, the increase in transmission loss of the plastic optical fiber becomes large, and the physical strength of the fiber lowers. Further, when the plastic optical fiber is exposed to an even higher temperature, the drop in extension of the plastic optical fiber becomes large, and the reliability of the plastic optical fiber becomes poor.

Further, when the proportion of the bisphenol AP is increased to 5% or more, not only can the long-term resistance to heat up to about 145° C., and the suppression of the lowering of the extension of the plastic optical fiber under a high temperature, be attained, but also the mechanical strength at a temperature of about 150° C. can be secured, such that the plastic optical fiber will not shrink at about 150° C. and it will not extend when pulled a little under that temperature.

Further, if the proportion of the bisphenol AF is smaller than 15 mol %, the moldability becomes poor; therefore molding has to be carried out at a high temperature; and the plastic optical fiber is colored at the time of molding, which increases the transmission loss; and in addition, although a mechanical change, such as shrinkage or lowering in mechanical strength, at high temperatures would not occur, a conspicuous increase in transmission loss is recognized.

The polycarbonate copolymer used for this optical fiber is such that, when 0.7 g of the polycarbonate copolymer is dissolved in 100 ml of methylene chloride, the specific viscosity measured at 20° C. is 0.160 to 0.410. If the specific viscosity is smaller than 0.160, the strength of the plastic optical fiber drops noticeably; whereas if the specific viscosity is larger than 0.410, the molding becomes difficult and the value of the transmission loss of the obtainable plastic optical fiber becomes inevitably high. The specific viscosity is preferably in the range from 0.165 to 0.345, more preferably in the range from 0.165 to 0.290.

Since the polycarbonate copolymer of the core part of the present plastic optical fiber is chemically stable and has a glass transition temperature as high as 155° C. or more, the increase in transmission loss is small if the present plastic optical fiber is exposed to a temperature of 145° C. for a long period of time. Further, if the present plastic optical fiber is exposed to that temperature for a long period of time, the drop of extension of the fiber is small.

Further, when the proportion of the bisphenol AP is increased to 5 mol % or more, since the polycarbonate copolymer of the core part of the plastic optical fiber has a glass transition temperature of 160° to 175° C., the plastic optical fiber will not shrink or deform at a temperature of about 150° C. The increase in transmission loss is small if the plastic optical fiber is pulled by applying a force at that temperature.

The optical waveguide of this invention is generally described below.

In comparison with a plastic optical fiber having a core part made of polycarbonate AP, the core part of the plastic optical fiber of the present invention is colored very slightly at a temperature of about 150° C., and the increase in transmission loss at that temperature is very small. Although a plastic optical fiber that uses a polycarbonate AP homopolymer for the core part is colored noticeably at a temperature of about 120° C. and cannot be used, the plastic optical fiber of the present invention attains a heat resistance service temperature that is 20 or more degree C. higher than that temperature. In comparison with a plastic optical fiber that uses polycarbonate AP, the plastic optical fiber of the present invention changes little in mechanical properties under a high temperature, and it also shrinks little under a high temperature.

In comparison with a plastic optical fiber whose core part is made of a polycarbonate AF homopolymer, in the case of the plastic optical fiber of the present invention, the polymer can be molded into a fiber without the polymer decomposing; that is, with the transmission loss being low.

The plastic optical fiber can be molded at a temperature of about 240° to 270° C.

As a clad layer of the plastic optical fiber of the present invention, a fluororesin, a silicone resin, and an imidated acrylic resin can be used. Examples of such resin include a tetrafluoroethylene/hexafluoroethylene copolymer, a tetrafluoroethylene/perfluoroalkyl vinyl ether copolymer, an ethylene/tetrafluoroethylene copolymer, a fluorinated polymethyl methacrylate, Teflon AF (trade name, manufactured by E. I. du Pont de Nemours & Co. Inc.), and Cytop (trade name, manufactured by Asahi Glass Co., Ltd.).

The plastic optical fiber can be formed by the common double drawing method or some other method.

When the plastic optical fiber is obtained by the double drawing method, the temperature of the head is about 240° to 280° C.

To lower the transmission loss of the plastic optical fiber, a preform is formed by a heated and reduced-pressure-applied method disclosed in Japanese Patent Application No. 245433/1990, and the preform may be made into a plastic optical fiber.

Since the plastic optical waveguide uses a specific polycarbonate copolymer for the core layer, the plastic optical waveguide is excellent in heat resistance, and it exhibits an excellent effect in that the increase in transmission loss is small without the occurrence of the decrease of extension (extensibility), even when the plastic optical waveguide is kept under a high temperature or when a force is applied to it under a high temperature. Therefore the optical waveguides can be used in various fields, in which heat resistance is required, for example in automobiles and electronic equipment.

Now the present invention will further be described with reference to the following Examples, but the invention is not limited to them. Parts and percentages are by weight, and the measurement was made as follows:

(a) Specific viscosity 0.7 Grams of the polymer was dissolved in 100 ml of methylene chloride, and the specific viscosity was measured at 20° C.

(b) Hydrolysis resistance

The lowering of the molecular weight when the polymer was held in steam at 120° C. for 150 hours was shown in terms of the retention rate of specific viscosity.

(c) Transparency

The polymer was compression-molded at 280° C. into a disk of diameter 40 mm and thickness 2 mm, and the light transmittance of the disk was measured.

(d) Heat resistance

The glass transition temperature was measured at a heating rate of 10° C./min using a DSC-910, manufactured by E. I. du Pont de Nemours & Co., Ltd.

(e) Heat stability

3 Grams of the polymer was placed in a test tube; the air was removed from the test tube under a vacuum; and, after the polymer was heat-treated at 330° C. for 4 hours, it was dissolved in 200 ml of methylene chloride; and the transmittance of light of 600 nm for the solution was measured using a quartz cell having an optical path length of 10 cm through a U-3400 spectrophotometer, manufactured by Hitachi, Ltd.

(f) Oxidation resistance

After 40 g of the polymer was heated for 4 hours at 280° C. in an air atmosphere in a thermostatic chamber, it was dissolved in 400 g of methylene chloride; then the transmittance of light of 860 nm to 280 nm for the solution was measured using a quartz cell having an optical path length of 25 cm through a U-3400 spectrophotometer, and the light transmittance was expressed in terms of the light transmittance per cm of the polymer.

(g) Transmission loss of the plastic optical fiber

The transmission loss of the plastic optical fiber was measured by the 10 m/1 m cut-back method, using an LED of 660 nm as a light source.

(h) The tensile test of the plastic optical fiber at 150° C.

The plastic optical fiber, of length 3 m, was set in an apparatus shown in FIG. 1, which was in turn placed in a thermostatic chamber at 150° C., thereby carrying out the evaluation. The increase in transmission loss was continuously monitored using an LED of 660 nm as a light source, and the evaluation was made by relative comparison with the initial value of the amount of outputted light. In the figure, 1 indicates pulleys of diameter 60 mm, 2 indicates a light source (660 nm: LED), 3 indicates the output, and 4 indicates the fixed end of the plastic optical fiber.

(i) Extension of the plastic optical fiber

The plastic optical fiber was pulled using a cylindrical chuck at a rate of extension of 100 mm/min, with the distance between gages being 100 mm, and the absolute value of the extension was measured.

(j) The change in extension after heat treatment of the plastic optical fiber

After heat treatment at 145° C. for 7 days, the plastic optical fiber was pulled using a cylindrical chuck at a rate of extension of 100 mm/min, with the distance between gages being 100 mm, and the absolute value of the extension was measured.

(k) The humidity resistance heat test of the plastic optical fiber

After the plastic optical fiber was held in steam at 120° C. for 4 days, it was pulled using a cylindrical chuck at a rate of extension of 100 mm/min, with the distance between gages being 100 mm, and the absolute value of the extension was measured.

EXAMPLE 1

249 Parts of deionized water and 16.4 parts of a 48.5% aqueous sodium hydroxide solution were charged into a reactor equipped with a stirrer, a thermometer, and a reflux condenser; nitrogen gas was bubbled through the solution for 30 min, to deoxidize it, and then 0.05 parts of hydrosulfite was added thereto; 27.1 parts of bisphenol AF of 99.98% purity, and 3.14 parts of bisphenol FL of 99:8% purity, were dissolved therein; and, after 267 parts of methylene chloride was added, 10.4 parts of phosgene was blown thereinto at 14° to 16° C. over about 60 min with stirring. Then, 5.6 parts of a 48.5% aqueous sodium hydroxide solution and 0.67 part of p-tert-butylphenol were added, and, after they were emulsified by stirring, 0.02 parts of triethylamine was added, followed by stirring at 30° C. for about 2 hours, to complete the reaction. After the completion of the reaction, the organic phase was separated, acidified with hydrochloric acid, and then washed with water repeatedly, to remove impurities, and then the methylene chloride was removed by evaporation, to obtain a copolymerized polymer. The specific viscosity of the obtained copolymerized polymer was 0.211, and the retention of the specific viscosity after the steam treatment was 79%, showing good hydrolysis resistance. The glass transition temperature was 167° C., showing high heat resistance; the light transmittance was 89%, which is good, and the light transmittance after the heat treatment was 82%, showing excellent heat stability; and the oxidation resistance was remarkably excellent in comparison with the polymer obtained from bisphenol A as shown by curve 1 (□) in FIG. 2.

EXAMPLE 2

1897 Parts of deionized water, 125 parts of a 48.5% aqueous sodium hydroxide solution, and 0.5 parts of hydrosulfite were placed in the same apparatus as used in Example 1, and after deoxidation was carried out in the same way as in Example 1, 183.5 parts of bisphenol AF of 99.98% purity and 47.9 parts of bisphenol FL of 99.8% purity were dissolved therein, then 2038 parts of methylene chloride was added, and 79.1 parts of phosgene was blown thereinto at 13° to 16° C. over about 50 min with stirring. Then, 42.5 parts of a 48.5% aqueous sodium hydroxide solution and 6.7 parts of p-tert-butylphenol were added and after they were emulsified by stirring, 0.17 part of triethylamine was added, followed by stirring at 30° C. for about 2 hours, to complete the reaction. Then the reaction mixture was treated in the same way as in Example 1, to obtain a copolymerized polymer. The specific viscosity of this copolymerized polymer was 0.177, the retention of the specific viscosity after the steam treatment was 80%, showing good hydrolysis resistance, the glass transition temperature was 178° C., showing high heat resistance, the light transmittance was 89%, which is good, the light transmittance after the heat treatment was 80%, showing excellent heat stability, and the oxidation resistance was remarkably excellent in comparison with the polymer obtained from bisphenol A as shown by curve 2 (+) in FIG. 2.

EXAMPLE 3

2371 Parts of deionized water, 156 parts of a 48.5% aqueous sodium hydroxide solution, and 0.6 parts of hydrosulfite were placed in the same apparatus as used in Example 1, and after deoxidation was carried out in the same way as in Example 1, 157.6 parts of bisphenol AF of 99.98% purity and 134.6 parts of bisphenol FL of 99.8% purity were dissolved therein, then 2548 parts of methylene chloride was added, and 98.5 parts of phosgene was blown thereinto at 13° to 16° C. over about 50 min with stirring. Then, 53.2 parts of a 48.5% aqueous sodium hydroxide solution and 8.5 parts of p-tert-butylphenol were added and after they were emulsified by stirring, 0.2 parts of triethylamine was added, followed by stirring at 30° C. for about 2 hours, to complete the reaction. Then the reaction mixture was treated in the same way as in Example 1, to obtain a copolymerized polymer. The specific viscosity of this copolymerized polymer was 0.178, the retention of the specific viscosity after the steam treatment was 85% and the glass transition temperature was 215° C., which show high hydrolysis resistance and high heat resistance, the light transmittance was 89%, which is good, the light transmittance after the heat treatment was 89%, showing excellent heat stability; and the oxidation resistance was remarkably excellent in comparison with the polymer obtained from bisphenol A as shown by curve 3 ( ) in FIG. 2.

EXAMPLE 4

543 Parts of deionized water, 54.8 parts of a 48.5% aqueous sodium hydroxide solution, and 0.2 parts of hydrosulfite were placed in the same apparatus as used in Example 1, and after deoxidation was carried out in the same way as in Example 1, 98.2 parts of bisphenol AF of 99.98% purity and 1.04 parts of bisphenol FL of 99.8% purity were dissolved therein, then 472 parts of methylene chloride was added, and 34.5 parts of phosgene was blown thereinto at 13° to 16° C. over about 50 min with stirring. Then, 18.4 parts of a 48.5% aqueous sodium hydroxide solution and 2.44 parts of p-tert-butylphenol were added and after they were emulsified by stirring, 0.1 part of triethylamine was added, followed by stirring at 30° C. for about 2 hours, to complete the reaction. Then the reaction mixture was treated in the same way as in Example 1, to obtain a copolymerized polymer. The glass transition temperature of the copolymerized polymer was 159° C., the specific viscosity was 0.172, the lowering rate of the specific viscosity after the steam treatment was 76%, showing good hydrolysis resistance, the light transmittance was 89%, which is good, and the light transmittance after the heat treatment was 84%, showing excellent heat stability.

COMPARATIVE EXAMPLE 1

Example 1 was repeated, except that bisphenol FL was not used and the amount of the bisphenol AF was changed to 30.2 parts, thereby obtaining a homopolymer of bisphenol AF. The glass transition temperature of this homopolymer was 157° C., showing poor heat resistance, the specific viscosity was 0.194, and the light transmittance was 89%, which is good, but the retention of the specific viscosity after the steam treatment was 69%, showing poor hydrolysis resistance. The light transmittance after heat treatment was as low as 71%, and the heat stability was deteriorated.

COMPARATIVE EXAMPLE 2

Example 1 was repeated, except that the bisphenol AF was not used and the amount of bisphenol FL was changed to 31.5 parts, thereby obtaining a homopolycarbonate of bisphenol FL. Although the glass transition temperature was enough as high as 287° C., the homopolycarbonate was not fully melted at 300° C. and could not give a satisfactory molded item.

COMPARATIVE EXAMPLE 3

A polycarbonate from bisphenol A which had a specific viscosity of 0.279 (Panlite AD-5503, manufactured by Teijin Chemicals Ltd.) was evaluated, the light transmittance was 89%, which is good, the glass transition temperature was as low as 149° C., showing poor heat resistance, and the oxidation resistance was poor as shown by curve 4 (Δ) in FIG. 2.

COMPARATIVE EXAMPLE 4

Example 1 was repeated, except that the amount of the used phosgene was changed to 12.0 parts (molar ratio: 1.35), thereby obtaining a copolymerized polymer. The specific viscosity of this copolymerized polymer was 0.203, and the glass transition temperature was 165° C., showing a high heat resistance, but the light transmittance after the heat treatment was 74%, showing poor heat stability.

COMPARATIVE EXAMPLE 5

Example 1 was repeated, except that the amount of the used phosgene was changed to 9.95 parts (molar ratio: 1.12), thereby obtaining a copolymerized polymer. The specific viscosity of this copolymerized polymer was only 0.150 and the copolymerized polymer was brittle and was not suitable for practical use.

EXAMPLE 5

To form a core layer, the polycarbonate copolymer prepared in Example 1 that had been passed through a 0.1-μm filter, to eliminate foreign matter was introduced into a resin introduction path of a spinning apparatus and was made into a thread with the head temperature being 245° C. A die was placed in the course of the draw-out and a thermosetting silicone resin (X-38-040HAB, manufactured by Shin-Etsu Chemical Co., Ltd.) was added thereinto, and was set in an oven positioned downstream thereof, thereby obtaining a plastic optical fiber having a core clad layer. The obtained plastic optical fiber had a core diameter of 0.96 mm and an outer diameter of 1.02 mm and the transmission loss was 940 dB/km (660 nm: LED).

After the obtained plastic optical fiber was allowed to stand at 150° C. for 1 month, the transmission loss was 1,000 dB/km (660 nm: LED).

Further, a load of 100 g was applied as shown in FIG. 1, then it was placed in a thermostatic chamber at 150° C., after three days the increase in transmission loss of the plastic optical fiber was measured, and it was found that the increase was 80 dB/km.

Further the extension of the obtained plastic optical fiber was measured and the value of the extension was 80%.

Further the extension of the obtained plastic optical fiber after the heat treatment at 145° C. for 7 days was measured and the value of the extension was 70%.

Further, the humidity resistance heat test of the plastic optical fiber at 120° C. was carried out and it was found that the extension of the fiber after 4 days of steaming at 120° C. was 50%.

EXAMPLE 6

To form a core layer, the polycarbonate copolymer prepared in Example 2 that had been passed through a 0.1-μm filter to eliminate foreign matter was introduced into a resin introduction path of a spinning apparatus and was made into a thread with the head temperature being 255° C. A die was placed in the course of the draw-out and a thermosetting silicone resin (X-38-040HAB, manufactured by Shin-Etsu Chemical Co., Ltd.) was added thereinto, and was set in an oven positioned downstream thereof, thereby obtaining a plastic optical fiber having a core clad layer.

The obtained plastic optical fiber had a core diameter of 0.96 mm and an outer diameter of 1.02 mm and the transmission loss was 1,000 dB/km (660 nm: LED).

After the obtained plastic optical fiber was allowed to stand at 150° C. for 1 month, the transmission loss was 1,000 dB/km (660 nm: LED).

Further, a load of 100 g was applied as shown in FIG. 1, then it was placed in a thermostatic chamber at 150° C., after three days the increase in transmission loss of the plastic optical fiber was measured, and it was found that the increase was 60 dB/km.

Further the extension of the obtained plastic optical fiber was measured and the value of the extension was 70%.

Further the extension of the obtained plastic optical fiber after the heat treatment at 145° C. for 7 days was measured and the value of the extension was 70%.

EXAMPLE 7

To form a core layer, the polycarbonate copolymer prepared in Example 3 that had been passed through a 0.1-μm filter, to eliminate foreign matter, was introduced into a resin introduction path of a spinning apparatus and was made into a thread with the head temperature being 280° C. A die was placed in the course of the draw-out and a thermosetting silicone resin (X-38-040HAB, manufactured by Shin-Etsu Chemical Co., Ltd.) was added thereinto, and was set in an oven positioned downstream thereof, thereby obtaining a plastic optical fiber having a core clad layer. The obtained plastic optical fiber had a core diameter of 0.96 mm and an outer diameter of 1.02 mm and the transmission loss was 1,250 dB/km (660 nm: LED).

After the obtained plastic optical fiber was allowed to stand at 150° C. for 1 month, the transmission loss was 1,450 dB/km (660 nm: LED).

Further, a load of 100 g was applied as shown in FIG. 1, then it was placed in a thermostatic chamber at 150° C., after three days the increase in transmission loss of the plastic optical fiber was measured, and it was found that the increase was 60 dB/km.

Further the extension of the obtained plastic optical fiber was measured and the value of the extension was 75%.

Further the extension of the obtained plastic optical fiber after the heat treatment at 145° C. for 7 days was measured and the value of the extension was 75%.

EXAMPLE 8

2276 parts of deionized water, 150 parts of a 48.5% aqueous sodium hydroxide solution, and 0.6 parts of hydrosulfite were placed in the same apparatus as used in Example 1, and after deoxidation was carried out in the same way as in Example 1, 261.6 parts of bisphenol AF of 99.98% purity and 14.3 parts of bisphenol FL of 99.8% purity were dissolved therein, then 2,447 parts of methylene chloride was added, and 95.0 parts of phosgene was blown thereinto at 13° to 16° C. over about 50 min with stirring. Then, 7.0 parts of p-tert-butylphenol and 51 parts of a 48.5% aqueous sodium hydroxide solution were added and after they were emulsified by stirring, 0.20 part of triethylamine was added, followed by stirring at 30° C. for about 2 hours, to complete the reaction. Then the reaction mixture was treated in the same way as in Example 1, to obtain a copolymerized polymer. The specific viscosity of the copolymerized polymer was 0.186 and the glass transition temperature was 163° C.

To form a core layer, the polycarbonate copolymer prepared above that had been passed through a 0.1-μm filter, to eliminate foreign matter, was introduced into a resin introduction path of a spinning apparatus and was made into a thread with the head temperature being 245° C. A die was placed in the course of the draw-out and a thermosetting silicone resin (X-38-040HAB, manufactured by Shin-Etsu Chemical Co., Ltd.) was added thereinto, and was set in an oven positioned downstream thereof, thereby obtaining a plastic optical fiber having a core clad layer. The obtained plastic optical fiber had a core diameter of 0.96 mm and an outer diameter of 1.02 mm and the transmission loss was 800 dB/km (660 nm: LED).

After the obtained plastic optical fiber was allowed to stand at 150° C. for 1 month, the transmission loss was 820 dB/km (660 nm: LED).

Further, a load of 100 g was applied as shown in FIG. 1, then it was placed in a thermostatic chamber at 150° C., after three days the increase in transmission loss of the plastic optical fiber was measured, and it was found that the increase was 150 dB/km.

Further the extension of the obtained plastic optical fiber was measured and the value of the extension was 95%.

Further the extension of the obtained plastic optical fiber after the heat treatment at 145° C. for 7 days was measured and the value of the extension was 75%.

EXAMPLE 9

543 Parts of deionized water, 54.8 parts of a 48.5% aqueous sodium hydroxide solution, and 0.2 parts of hydrosulfite were placed in the same apparatus as used in Example 1, and after deoxidation was carried out in the same way as in Example 1, 98.2 parts of bisphenol AF of 99.98% purity and 1.04 parts of bisphenol FL of 99.8% purity were dissolved therein, then 472 parts of methylene chloride was added, and 34.5 parts of phosgene was blown thereinto at 13° to 16° C. over about 50 min with stirring. Then, 2.44 parts of p-tert-butylphenol and 18.4 parts of a 48.5% aqueous sodium hydroxide solution were added and after they were emulsified by stirring, 0.1 part of triethylamine was added, followed by stirring at 30° C. for about 2 hours, to complete the reaction. Then the reaction mixture was treated in the same way as in Example 1 to obtain a copolymerized polymer. The specific viscosity of the copolymerized polymer was 0.172 and the glass transition temperature was 159° C.

To form a core layer, the polycarbonate copolymer prepared above that had been passed through a 0.1-μm filter to eliminate foreign matter was introduced into a resin introduction path of a spinning apparatus and was made into a thread with the head temperature being 240° C. A die was placed in the course of the draw-out and a thermosetting silicone resin (X-38-040HAB manufactured by Shin-Etsu Chemical Co., Ltd.) was added thereinto, and was set in an oven positioned downstream thereof, thereby obtaining a plastic optical fiber having a core clad layer. The obtained plastic optical fiber had a core diameter of 0.96 mm and an outer diameter of 1.02 mm and the transmission loss was 780 dB/km (660 nm: LED).

After the obtained plastic optical fiber was allowed to stand at 150° C. for 1 month, the transmission loss was 790 dB/km (660 nm: LED).

Further, a load of 100 g was applied as shown in FIG. 1, then it was placed in a thermostatic chamber at 150° C., after three days the increase in transmission loss of the plastic optical fiber was measured, and it was found that the increase was 420 dB/km.

Further, the tension test in a thermostatic chamber at 145° C. was carried out and it was found that the increase was 150 dB/km.

Further the extension of the obtained plastic optical fiber was measured and the value of the extension was 80%.

Further the extension of the obtained plastic optical fiber after the heat treatment at 145° C. for 7 days was measured and the value of the extension was 50%.

Further, the humidity resistance heat test of the plastic optical fiber at 120° C. was carried out and it was found that the extension of the fiber after 4 days of steaming at 120° C. was 30%.

Thus, it was found that the plastic optical fiber (Example 5) could be reliably and satisfactorily used at a temperature of about 145° C.

The results of the Examples are summarized in Table 1.

TABLE 1

| | Example No. | | | | |
|---|---|---|---|---|---|
| | 5 | 6 | 7 | 8 | 9 |
| Spinning temperature (°C.) | 245 | 255 | 280 | 245 | 240 |
| Transmission loss (dB/km) | 940 | 1,000 | 1,250 | 800 | 780 |
| Transmission loss (dB/Km) after 1 month at 150° C. | 1,000 | 1,100 | 1,450 | 820 | 790 |
| Increase in transmission loss (dB/km) after 3 days at 150° C. under a load of 100 g | 80 | 60 | 60 | 150 | 410 |
| Increase in transmission loss (dB/km) after 3 days at 145° C. under a load of 100 g | — | — | — | — | 140 |
| Extension (%) of fiber | 80 | 70 | 75 | 95 | 80 |
| Extension (%) of fiber after 7 days at 145° C. | 70 | 70 | 75 | 75 | 50 |
| Extension (%) of fiber after steam treatment at 120° C. for 4 days | 50 | — | — | — | 30 |

Note:
- denotes that the measurement was not carried out.

COMPARATIVE EXAMPLE 6

To form a core layer, the homopolymer (polycarbonate AF) prepared in Comparative Example 1 that had been passed through a 0.1-μm filter to eliminate foreign matter was introduced into a resin introduction path of a spinning apparatus and was made into a thread with the head temperature being 240° C. A die was placed in the course of the draw-out and a thermosetting silicone resin (X-38-040HAB, manufactured by Shin-Etsu Chemical Co., Ltd.) was added thereinto, and was set in an oven positioned downstream thereof, thereby obtaining a plastic optical fiber having a core clad layer. The obtained plastic optical fiber had a core diameter of 0.96 mm and an outer diameter of 1.02 mm and the transmission loss was 780 dB/km (660 nm: LED).

After the obtained plastic optical fiber was allowed to stand at 150° C. for 1 month, the transmission loss was 790 dB/km (660 nm: LED).

Further, a load of 100 g was applied as shown in FIG. 1, then it was placed in a thermostatic chamber at 150° C., after three days the increase in transmission loss of the plastic optical fiber was measured, and it was found that the increase was 450 dB/km.

Further the extension of the obtained plastic optical fiber was measured and the value of the extension was 80%.

Further the extension of the obtained plastic optical fiber after the heat treatment at 145° C. for 7 days was measured and the value of the extension was about 10%.

Further, the humidity resistance heat test of the plastic optical fiber at 120° C. was carried out and it was found that the extension of the fiber after 4 days of steaming at 120° C. was 10% or less, and the fiber became brittle being apt to break.

COMPARATIVE EXAMPLE 7

Example 1 was repeated, except that the bisphenol AF and bisphenol FL were not used and 250 g of bisphenol AP of 99.96% purity was used, thereby obtaining a homopolymer. The specific viscosity of this homopolymer was 0.188 and the glass transition temperature was as high as 175° C.

To form a core layer, the above polycarbonate AP that had been passed through a 0.1-μm filter, to eliminate foreign matter, was introduced into a resin introduction path of a spinning apparatus and was made into a thread with the head temperature being 270° C. A die was placed in the course of the draw-out and a thermosetting silicone resin (X-38-040HAB, manufactured by Shin-Etsu Chemical Co., Ltd.) was added thereinto, and was set in an oven positioned downstream thereof, thereby obtaining a plastic optical fiber having a core clad layer. The obtained plastic optical fiber had a core diameter of 0.96 mm and an outer diameter of 1.02 mm and the transmission loss was 1,450 dB/km (660 nm: LED).

After the obtained plastic optical fiber was allowed to stand at 150° C. for 1 month, the transmission loss could not be measured because it was 3,000 dB/km (660 nm: LED).

The results of Comparative Examples 6 and 7 are summarized in Table 2.

TABLE 2

|  | Comparative Example No. | |
| --- | --- | --- |
|  | 6 | 7 |
| Spinning temperature (°C.) | 240 | 270 |
| Transmission loss (dB/km) | 780 | 1,450 |
| Transmission loss (dB/km) after 1 month at 150° C. | 790 | could not be measured |
| Increase in transmission loss (dB/km) after 3 days at 150° C. under a load of 100 g | 450 | — |

TABLE 2-continued

|  | Comparative Example No. | |
| --- | --- | --- |
|  | 6 | 7 |
| Extension (%) of fiber | 80 | — |
| Extension (%) of fiber after 7 days at 145° C. | 10 | — |
| Extension (%) of fiber after steam treatment at 120° C. for 4 days | <10 | — |

Note:
- denotes that the measurement was not carried out.

EXAMPLE 10

460 Parts of deionized water and 52 parts of a 48.5% aqueous sodium hydroxide solution were charged into a reactor equipped with a stirrer, a thermometer, and a reflux condenser, nitrogen gas was bubbled through the solution for 30 min to deoxidize it, then 0.14 parts of hydrosulfite was added thereto, 42.4 parts of bisphenol AF of 99.98% purity and 36.6 parts of bisphenol AP of 99.98% purity were dissolved therein, and after 300 parts of methylene chloride was added, 29.2 parts of phosgene was blown thereinto at 14° to 16° C. over about 60 min with stirring. Then, 9.8 parts of a 48.5% aqueous sodium hydroxide solution and 1.9 parts of p-tert-butylphenol were added and after they were emulsified by stirring, 0.04 part of triethylamine was added, followed by stirring at 30° C. for about 2 hours, to complete the reaction. After the completion of the reaction, the organic phase was separated, was acidified with hydrochloric acid, and was washed with water repeatedly, to remove impurities, and then the methylene chloride was removed by evaporation, to obtain a copolymerized polymer. The specific viscosity of the obtained copolymerized polymer was 0.255, the retention of the specific viscosity after the steam treatment was 84% and the glass transition temperature was 170° C. which show high hydrolysis resistance and high heat resistance, and the light transmittance after the heat treatment was 80%, showing excellent heat stability. The oxidation resistance thereof was remarkably excellent in comparison with the polymer obtained from bisphenol AP and the polymer obtained from bisphenol A as shown by curve 1 (□) in FIG. 3.

EXAMPLE 11

Example 10 was repeated, except that the amount of the bisphenol AF to be used was changed to 25.4 parts and the amount of the bisphenol AP to be used was changed to 51.2 parts, thereby preparing a copolymerized polymer. The specific viscosity of the copolymerized polymer was 0.263, the retention of the specific viscosity after the steam treatment was 88% and the glass transition temperature was 173° C., which show high hydrolysis resistance and high heat resistance, and the light transmittance after the heat treatment was 79%, showing excellent heat stability. The oxidation resistance thereof was remarkably excellent in comparison with the polymer obtained from bisphenol AP and the polymer obtained from bisphenol A as shown by curve 2 (O) in FIG. 3.

EXAMPLE 12

Example 10 was repeated, except that the amount of the bisphenol AF to be used was changed to 83.7 parts and the amount of the bisphenol AP to be used was changed to 0.73 parts, thereby preparing a copolymerized polymer. The glass transition temperature of this copolymerized polymer was 159° C., the specific viscosity was 0.242, the retention of the specific viscosity after the steam treatment was 79%, showing high hydrolysis resistance, and the light transmittance after the heat treatment was 84%, showing excellent heat stability.

COMPARATIVE EXAMPLE 8

Example 10 was repeated, except that the bisphenol AF was not used and the amount of the bisphenol AP was changed to 73.1 parts, thereby obtaining a homopolymer of bisphenol AP. The specific viscosity of this homopolymer was 0.301, the glass transition temperature was 179° C., showing high heat resistance, but the light transmission after the heat treatment was 69%, showing low heat stability, and the oxidation resistance was poor as shown by curve 3 (+) in FIG. 3.

COMPARATIVE EXAMPLE 9

Example 10 was repeated, except that the amount of the used phosgene was changed to 574.3 parts (molar ratio: 1.12), thereby obtaining a copolymerized polymer. The specific viscosity of this copolymerized polymer was only 0.153 and the copolymerized polymer was brittle and was not suitable for practical use.

COMPARATIVE EXAMPLE 10

Example 10 was repeated, except that the amount of the used phosgene was changed to 692.3 parts (molar ratio: 1.35), thereby obtaining a copolymerized polymer. The specific viscosity of this copolymerized polymer was 0.245, and the glass transition temperature was 165° C., but the light transmittance after the heat treatment was as low as 71%, showing poor heat stability.

EXAMPLE 13

To form a core layer, the polycarbonate copolymer prepared in Example 10 that had been passed through a 0.1-μm filter to eliminate foreign matter was introduced into a resin introduction path of a spinning apparatus and was made into a thread with the head temperature being 250° C. A die was placed in the course of the draw-out and a thermosetting silicone resin (X-38-091HAB, manufactured by Shin-Etsu Chemical Co., Ltd.) was added thereinto, and was set in an oven positioned downstream thereof, thereby obtaining a plastic optical fiber having a core clad layer. The obtained plastic optical fiber had a core diameter of 0.96 mm and an outer diameter of 1.02 mm and the transmission loss was 920 dB/km (660 nm: LED).

After the obtained plastic optical fiber was allowed to stand at 150° C. for 1 month, the transmission loss was 1,020 dB/km (660 nm: LED).

Further, a load of 100 g was applied as shown in FIG. 1, then it was placed in a thermostatic chamber at 150° C., after three days the increase in transmission loss of the plastic optical fiber was measured, and it was found that the increase was 100 dB/km.

Further the extension of the obtained plastic optical fiber was measured and the value of the extension was 90%.

Further the extension of the obtained plastic optical fiber after the heat treatment at 145° C. for 7 days was measured and the value of the extension was about 90%.

Further, the humidity resistance heat test of the plastic optical fiber at 120° C. was carried out and it was found that the extension of the fiber after 4 days of steaming at 120° C. was 80%.

EXAMPLE 14

3280 parts of deionized water and 372 parts of a 48.5% aqueous sodium hydroxide solution were charged into a reactor equipped with a stirrer, a thermometer, and a reflux condenser, nitrogen gas was bubbled through the solution for 50 min to deoxidize it, then 0.99 part of hydrosulfite was added thereto, 544.3 parts of bisphenol AF of 99.98% purity and 52.2 parts of bisphenol AP of 99.98% purity were dissolved therein, and after 2150 parts of methylene chloride was added, 210 parts of phosgene was blown thereinto at 14° to 16° C. over about 60 min with stirring. Then, 13.3 parts of p-tert-butylphenol and 70.0 parts of a 48.5% aqueous sodium hydroxide solution were added and after they were emulsified by stirring, 0.28 part of triethylamine was added, followed by stirring at 30° C. for about 2 hours, to complete the reaction. After the completion of the reaction, the product was diluted with methylene chloride, was washed with water, was acidified with hydrochloric acid, and was washed with water until the electric conductivity of the water phase was brought almost to that of deionized water, and then the methylene chloride was removed by evaporation to obtain a copolymerized polymer.

The specific viscosity of this copolymerized polymer was 0.210 and the glass transition temperature was 162° C.

To form a core layer, the polycarbonate copolymer prepared above that had been passed through a 0.1-μm filter to eliminate foreign matter was introduced into a resin introduction path of a spinning apparatus and was made into a thread with the head temperature being 240° C. A die was placed in the course of the draw-out and a thermosetting silicone resin (X-38-091HAB, manufactured by Shin-Etsu Chemical Co., Ltd.) was added thereinto, and was set in an oven positioned downstream thereof, thereby obtaining a plastic optical fiber having a core clad layer. The obtained plastic optical fiber had a core diameter of 0.96 mm and an outer diameter of 1.02 mm and the transmission loss was 850 dB/km (660 nm: LED).

After the obtained plastic optical fiber was allowed to stand at 150° C. for 1 month, the transmission loss was 930 dB/km (660 nm: LED).

Further, a load of 100 g was applied as shown in FIG. 1, then it was placed in a thermostatic chamber at 150° C., after three days the increase in transmission loss of the plastic optical fiber was measured, and it was found that the increase was 180 dB/km.

Further the extension of the obtained plastic optical fiber was measured and the value of the extension was 80%.

Further the extension of the obtained plastic optical fiber after the heat treatment at 145° C. for 7 days was measured and the value of the extension was about 70%.

Further, the humidity resistance heat test of the plastic optical fiber at 120° C. was carried out and it was found that the extension of the fiber after 4 days of steaming at 120° C. was 40%.

EXAMPLE 15

3831.8 Parts of deionized water and 433.2 parts of a 48.5% aqueous sodium hydroxide solution were charged into a reactor equipped with a stirrer, a thermometer, and a reflux condenser, nitrogen gas was bubbled through the solution for 60 min to deoxidize it, then 1.16 parts of hydrosulfite was added thereto, 176.4 parts of bisphenol AF of 99.98% purity and 456.8 parts of bisphenol AP of 99.98% purity were dissolved therein, and after 2500 parts of methylene chloride was added, 244 parts of phosgene was blown thereinto at 14° to 16° C. over about 60 min with stirring. Then, 15.8 parts of p-tert-butylphenol and 81.6 parts of a 48.5% aqueous sodium hydroxide solution were added and after they were emulsified by stirring, 0.33 part of triethylamine was added, followed by stirring at 30° C. for about 2 hours, to complete the reaction. After the completion of the reaction, the product was diluted with methylene chloride, was washed with water, was acidified with hydrochloric acid, and was washed with water until the electric conductivity of the water phase was brought almost to that of deionized water, and then the methylene chloride was removed by evaporation, to obtain a copolymerized polymer.

The specific viscosity of this copolymerized polymer was 0.203 and the glass transition temperature was 174° C.

To form a core layer, the polycarbonate copolymer prepared above that had been passed through a 0.1-μm filter to eliminate foreign matter was introduced into a resin introduction path of a spinning apparatus and was made into a thread with the head temperature being 260° C. A die was placed in the course of the draw-out and a thermosetting silicone resin (X-38-091HAB, manufactured by Shin-Etsu Chemical Co., Ltd.) was added thereinto, and was set in an oven positioned downstream thereof, thereby obtaining a plastic optical fiber having a core clad layer. The obtained plastic optical fiber had a core diameter of 0.96 mm and an outer diameter of 1.02 mm and the transmission loss was 1,050 dB/km (660 nm: LED).

After the obtained plastic optical fiber was allowed to stand at 150° C. for 1 month, the transmission loss was 1,200 dB/km (660 nm: LED).

Further, a load of 100 g was applied as shown in FIG. 1, then it was placed in a thermostatic chamber at 150° C., after three days the increase in transmission loss of the plastic optical fiber was measured, and it was found that the increase was 80 dB/km.

Further the extension of the obtained plastic optical fiber was measured and the value of the extension was 70%.

Further the extension of the obtained plastic optical fiber after the heat treatment at 145° C. for 7 days was measured and the value of the extension was about 70%.

EXAMPLE 16

460 Parts of deionized water and 52 parts of a 48.5% aqueous sodium hydroxide solution were charged into a reactor equipped with a stirrer, a thermometer, and a reflux condenser, and nitrogen gas was bubbled through the solution for 30 min to deoxidize it. Then 0.14 part of hydrosulfite was added thereto, 83.7 parts of bisphenol AF of 99.98% purity and 0.73 part of bisphenol AP of 99.98% purity were dissolved therein, and after 300 parts of methylene chloride was added, 29.2 parts of phosgene was blown thereinto at 14° to 16° C. over about 60 min with stirring. Then, 1.9 parts of p-tert-butylphenol and 9.8 parts of a 48.5% aqueous sodium hydroxide solution were added and after they were emulsified by stirring, 0.04 part of triethylamine was added, followed by stirring at 30° C. for about 2 hours, to complete the reaction. After the completion of the reaction, the product was diluted with methylene chloride, was washed with water, was acidified with hydrochloric acid, and was washed with water until the electric conductivity of the water phase was brought almost to that of deionized water, and then the methylene chloride was removed by evaporation, to obtain a copolymerized polymer.

The specific viscosity of this copolymerized polymer was 0.242 and the glass transition temperature was 159° C.

To form a core layer, the polycarbonate copolymer prepared above that had been passed through a 0.1-μm filter to eliminate foreign matter was introduced into a resin introduction path of a spinning apparatus and was made into a thread with the head temperature being 240° C. A die was placed in the course of the draw-out and a thermosetting silicone resin (X-38-091HAB, manufactured by Shin-Etsu Chemical Co., Ltd.) was added thereinto, and was set in an oven positioned downstream thereof, thereby obtaining a plastic optical fiber having a core clad layer. The obtained plastic optical fiber had a core diameter of 0.96 mm and an outer diameter of 1.02 mm and the transmission loss was 780 dB/km (660 nm: LED).

After the obtained plastic optical fiber was allowed to stand at 150° C. for 1 month, the transmission loss was 790 dB/km (660 nm: LED).

Further, a load of 100 g was applied as shown in FIG. 1, then it was placed in a thermostatic chamber at 150° C., after three days the increase in transmission loss of the plastic optical fiber was measured, and it was found that the increase was 420 dB/km. When the tension test was carried out similarly at 145° C., the increase in transmission loss was 150 dB/km.

Further the extension of the obtained plastic optical fiber was measured and the value of the extension was 80%.

Further the extension of the obtained plastic optical fiber after the heat treatment at 145° C. for 7 days was measured and the value of the extension was about 50%.

Further, the humidity resistance heat test of the plastic optical fiber at 120° C. was carried out and it was found that the extension of the fiber after 4 days of steaming at 120° C. was 25%.

Thus, the plastic optical fiber in Example 16 can be withstand to be used at a temperature of about 145° C. The results of Examples 13 to 16 are summarized in Table 3.

TABLE 3

|  | Example No. | | | |
| --- | --- | --- | --- | --- |
|  | 13 | 14 | 15 | 16 |
| Spinning temperature (°C.) | 250 | 240 | 260 | 240 |
| Transmission loss (dB/km) | 920 | 850 | 1,050 | 780 |
| Transmission loss (dB/km) after 1 month at 150° C. | 1,020 | 930 | 1,200 | 790 |
| Increase in transmission loss (dB/km) after 3 days at 150° C. under a load of 100 g | 100 | 180 | 80 | 420 |
| Increase in transmission loss (dB/km) after 3 days at 145° C. under a load of 100 g | — | — | — | 150 |
| Extension (%) of fiber | 90 | 80 | 70 | 80 |
| Extension (%) of fiber after 7 days at 145° C. | 90 | 70 | 70 | 50 |
| Extension (%) of fiber after steam treatment at 120° C. for 4 days | 80 | 40 | — | 25 |

Note:
- denotes that the measurement was not carried out.

COMPARATIVE EXAMPLE 11

Example 10 was repeated, except that the bisphenol AF was not used and the amount of bisphenol AP of 99.98% purity was changed to 731 parts, thereby obtaining a homopolymer of bisphenol AP. The specific viscosity of this homopolymer was 0.201 and the glass transition temperature was 179° C., showing a high heat resistance.

To form a core layer, the above polycarbonate AP that had been passed through a 0.1-μm filter to eliminate foreign matter was introduced into a resin introduction path of a spinning apparatus and was made into a thread with the head temperature being 270° C. A die was placed in the course of the draw-out and a thermosetting silicone resin (X-38-091HAB, manufactured by Shin-Etsu Chemical Co., Ltd.) was added thereinto, and was set in an oven positioned downstream thereof, thereby obtaining a plastic optical fiber having a core clad layer. The obtained plastic optical fiber had a core diameter of 0.96 mm and an outer diameter of 1.02 mm and the transmission loss was 1,450 dB/km (660 nm: LED).

After the obtained plastic optical fiber was allowed to stand at 150° C. for 1 month, the transmission loss could not be measured because it was 3,000 dB/km (660 nm: LED) over.

Further, a load of 100 g was applied as shown in FIG. 1, then it was placed in a thermostatic chamber at 150° C., after three days the increase in transmission loss of the plastic optical fiber was measured, and it was found that the increase was 400 dB/km.

COMPARATIVE EXAMPLE 12

Example 10 was repeated, except that the amount of bisphenol AF of 99.98 purity was changed to 73.1 parts and the amount of bisphenol AP of 99.98% purity was changed to 657.7 parts, thereby obtaining a polycarbonate copolymer. The specific viscosity of this polycarbonate copolymer was 0.189.

To form a core layer, the above polycarbonate AP that had been passed through a 0.1-μm filter to eliminate foreign matter was introduced into a resin introduction path of a spinning apparatus and was made into a thread with the head temperature being 270° C. A die was placed in the course of the draw-out and a thermosetting silicone resin (X-38-091HAB, manufactured by Shin-Etsu Chemical Co., Ltd.) was added thereinto, and was set in an oven positioned downstream thereof, thereby obtaining a plastic optical guide having a core clad layer. The obtained plastic optical fiber had a core diameter of 0.96 mm and an outer diameter of 1.02 mm and the transmission loss was 130 dB/km (660 nm: LED).

After the obtained plastic optical fiber was allowed to stand at 150° C. for 1 month, the transmission loss was 2,500 dB/km (660 nm: LED).

Further, a load of 100 g was applied as shown in FIG. 1, then it was placed in a thermostatic chamber at 150° C., after three days the increase in transmission loss of the plastic optical fiber was measured, and it was found that the increase was 220 dB/km.

The results of Comparative Examples 11 and 12 are shown in Table 4.

TABLE 4

|  | Comparative Example No. | |
|---|---|---|
|  | 11 | 12 |
| Spinning temperature (°C.) | 270 | 270 |
| Transmission loss (dB/km) | 1,450 | 1,300 |
| Transmission loss (dB/km) after 1 month at 150° C. | could not be measured | 2,500 |
| Increase in transmission loss (dB/km) after 3 days at 150° C. under a load of 100 g | 400 | 220 |
| Extension (%) of fiber | — | — |
| Extension (%) of fiber after 7 days at 145° C. | — | — |
| Extension (%) of fiber after steam treatment at 120° C. for 4 days | — | — |

Note:
- denotes that the measurement was not carried out.

Having described our invention as related to the present embodiments, it is our intention that the invention not be limited by any of the details of the description, unless otherwise specified, but rather be construed broadly within its spirit and scope as set out in the accompanying claims.

What we claim is:

1. An aromatic polycarbonate copolymer obtained by reacting a dihydric phenol component, comprising 15 to 99.5 mol % of (A) 2,2-bis(4-hydroxyphenyl)-1,1,1,3,3,3-hexafluoropropane and 85 to 0.5 mol % of (C) 1,1-bis(4-hydroxyphenyl)-1-phenylethane, with a carbonate precursor substance; wherein said component (A) has a purity of 99.98% or more and said component (C) has a purity of 99.95% or more, and wherein when 0.7 g of the said aromatic polycarbonate copolymer is dissolved in 100 ml of methylene chloride, the specific viscosity of the thus obtained solution measured at 20° C. is in the range from 0.160 to 0.410.

2. The aromatic polycarbonate copolymer according to claim 1, wherein the said dihydric phenol component comprises 15 to 95 mol % of component (A) and 85 to 5 mol % of component (C).

3. The aromatic polycarbonate copolymer according to claim 1, wherein the said dihydric phenol component comprises 30 to 95 mol % of component (A) and 70 to 5 mol % of component (C).

4. The aromatic polycarbonate copolymer according to claim 1, wherein the specific viscosity of the aromatic polycarbonate copolymer solution is in the range from 0.165 to 0.345.

5. The aromatic polycarbonate copolymer according to claim 1, wherein the specific viscosity of the aromatic polycarbonate copolymer solution is in the range from 0.165 to 0.290.

6. The aromatic polycarbonate copolymer according to claim 1, wherein the said aromatic polycarbonate copolymer comprises an antioxidant selected from the group consisting of phosphites, phenols, and organosulfurs, in an amount of 0.001 to 1.0 part by weight per 100 parts by weight of the aromatic polycarbonate copolymer.

7. The aromatic polycarbonate copolymer according to claim 6, wherein the antioxidant is a phosphite.

8. The aromatic polycarbonate copolymer according to claim 1, wherein said dihydric phenol component comprises 50 mol % of component (A) and 50 mol % of component (C).

9. A method for producing an aromatic polycarbonate copolymer by reacting an aqueous alkali solution of dihydric phenol component, comprising 15 to 99.5 mol % 2,2-bis(4-hydroxyphenyl)-1,1,1,3,3,3-hexafluoropropane and 85 to 0.5 mol % 1,1-bis(4-hydroxyphenyl)-1-phenylethane, with phosgene in the presence of an organic solvent, which comprises reacting said dihydric phenol component with phosgene at the molar ratio of the phosgene to all of the dihydric phenol component being from 1.15 to 1.30 and the reaction temperature being 20° C. or below.

* * * * *